May 16, 1950      R. G. CUDINI      2,507,504
METHOD OF DEEP DRILLING
Original Filed Feb. 16, 1948      5 Sheets-Sheet 2
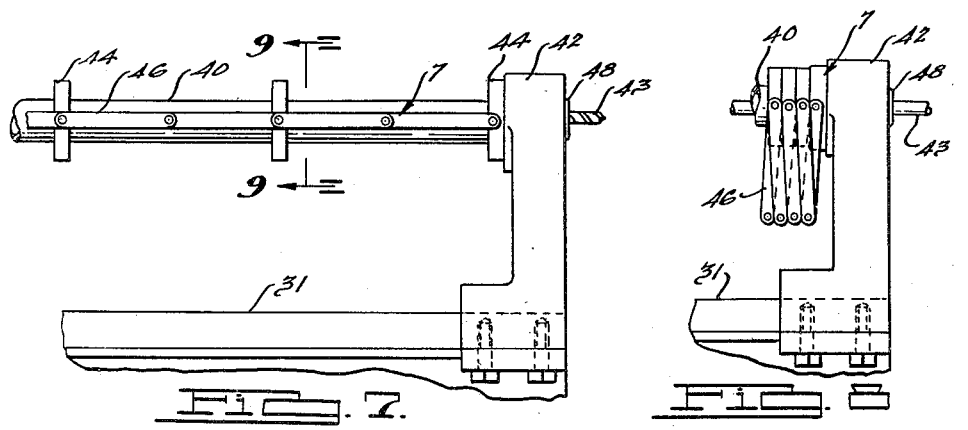
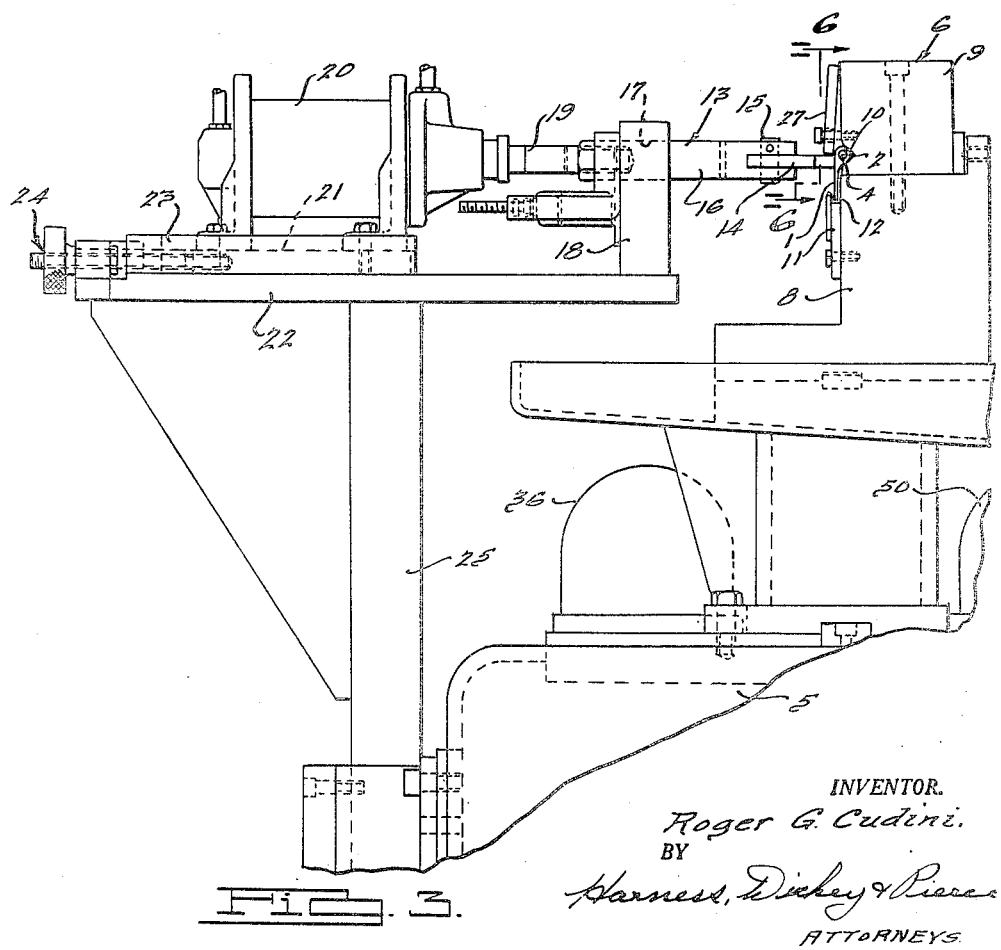
INVENTOR.
Roger G. Cudini.
BY
Harness, Dickey & Pierce
ATTORNEYS May 16, 1950     R. G. CUDINI     2,507,504
METHOD OF DEEP DRILLING
Original Filed Feb. 16, 1948     5 Sheets-Sheet 3
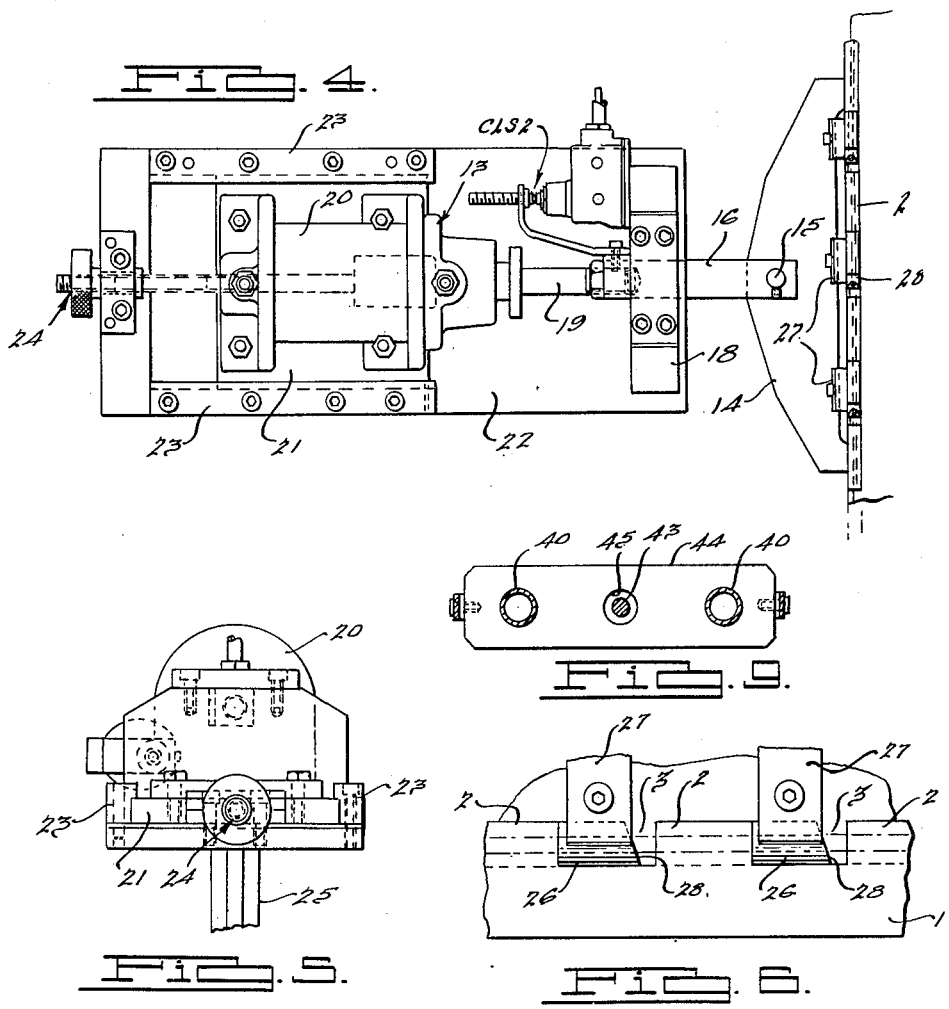
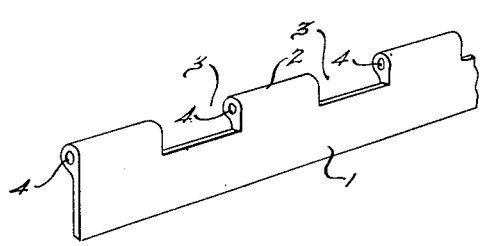
INVENTOR.
Roger G. Cudini,
BY
Harness, Dickey & Pierce
ATTORNEYS.

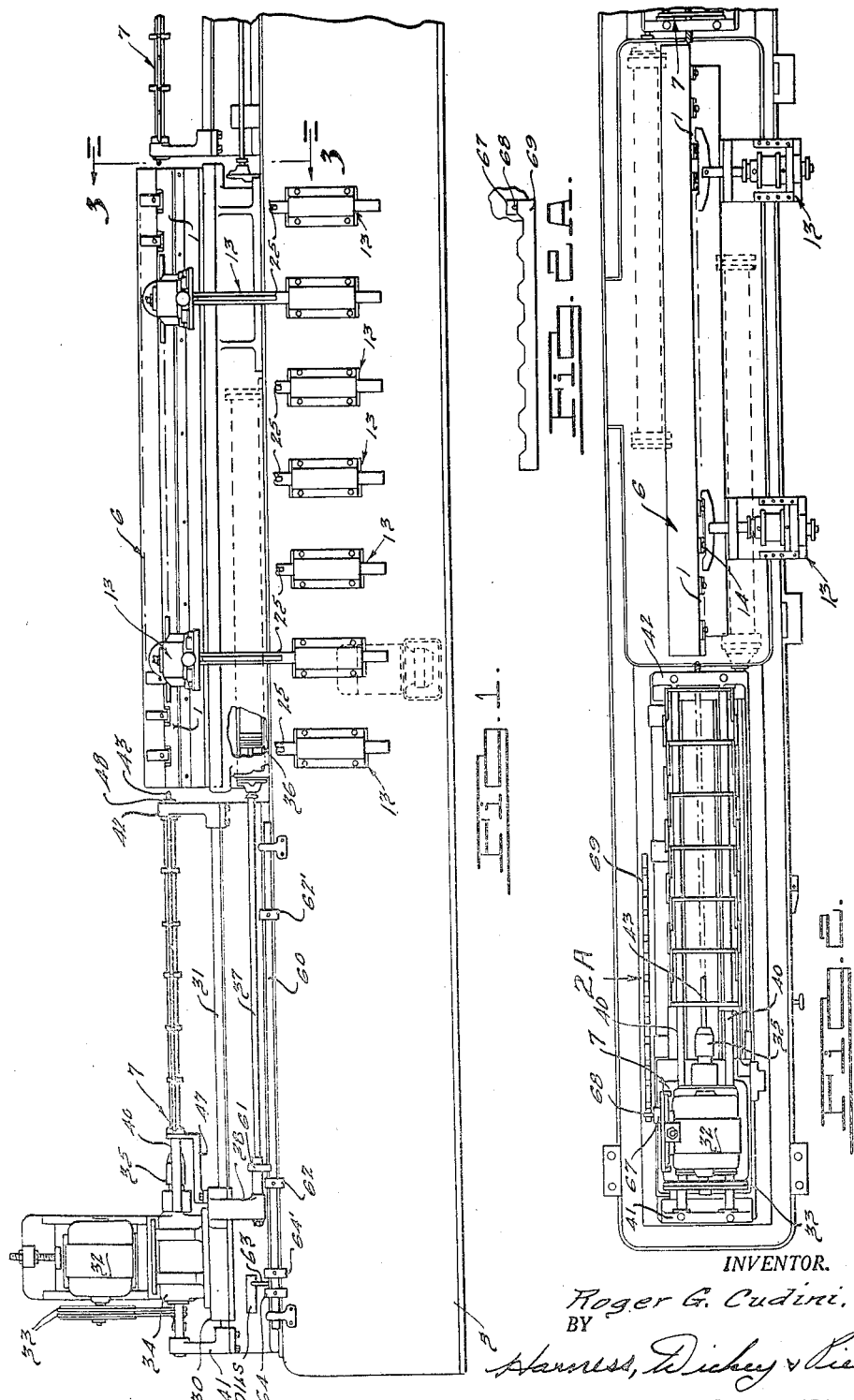

Patented May 16, 1950

2,507,504

UNITED STATES PATENT OFFICE 2,507,504

METHOD OF DEEP DRILLING

Roger G. Cudini, Birmingham, Mich., assignor to Moynahan Bronze Company, Detroit, Mich., a corporation of Michigan Original application February 16, 1948, Serial No. 8,669. Divided and this application September 3, 1949, Serial No. 114,033

2 Claims. (Cl. 77—5)

The present invention relates to a novel method of drilling holes in an elongated workpiece and is a division of the copending application of Roger G. Cudini, Serial No. 8,669, filed February 16, 1948.

One of the primary objects of the present invention is to provide a novel method of drilling concentric and precisely aligned holes in the spaced projections of elongated workpieces, where the holes are formed in alternating projections on one workpiece which are adapted to mate in complementary recesses between the projections on a mating workpiece, so that the finished workpieces are uniform and will properly mate with similarly produced workpieces.

Another object of the invention is to provide a novel method of discontinuously drilling through spaced projections where the drill is constantly rotated and continuously fed through the spaced projections in sequence to drill precisely aligned opening therethrough and in which the leading end of the drill is precisely aligned by engaging and guiding it as it passes through the spaces between the projections.

A further object of the invention is to provide a novel method of forming precisely aligned openings in a workpiece in which the workpiece and drill are of considerable length, as compared to the diameter of the drill and consequently the diameter of the openings through the workpiece so that there will be uniformity in succeeding workpieces, for later engagement with each other.

Other objects of the invention will be apparent from the following specification, the drawings relating thereto, and from the claims hereinafter set forth.

In the drawings in which like numerals are used to designate like parts in the several views throughout:

Figure 1 is a partial front elevational view of a drilling machine embodying features of the present invention;

Fig. 2 is a top plan view thereof;

Fig. 2A is an elevational view of a portion of the structure shown in Fig. 2 looking in the direction of the arrow 2A;

Fig. 3 is an enlarged partial elevational view taken substantially along the line 3—3 of Fig. 1;

Fig. 4 is a top plan view of the structure shown in Fig. 3;

Fig. 5 is an end elevational view taken from the left of the structure shown in Fig. 4;

Fig. 6 is a partial elevational view taken substantially along the line 6—6 of Fig. 3;

Fig. 7 is an enlarged partial side-elevational view of a portion of the structure shown in Fig. 1, showing the manner in which the drill is supported in its movement to and from the workpiece;

Fig. 8 is a view similar to Fig. 7 and showing the parts thereof in a different position;

Fig. 9 is a cross-sectional view taken substantially along the line 9—9 of Fig. 7;

Fig. 10 is a perspective view of a portion of a hinge or connector blank which is the workpiece in the illustrated embodiment;

Figure 11:
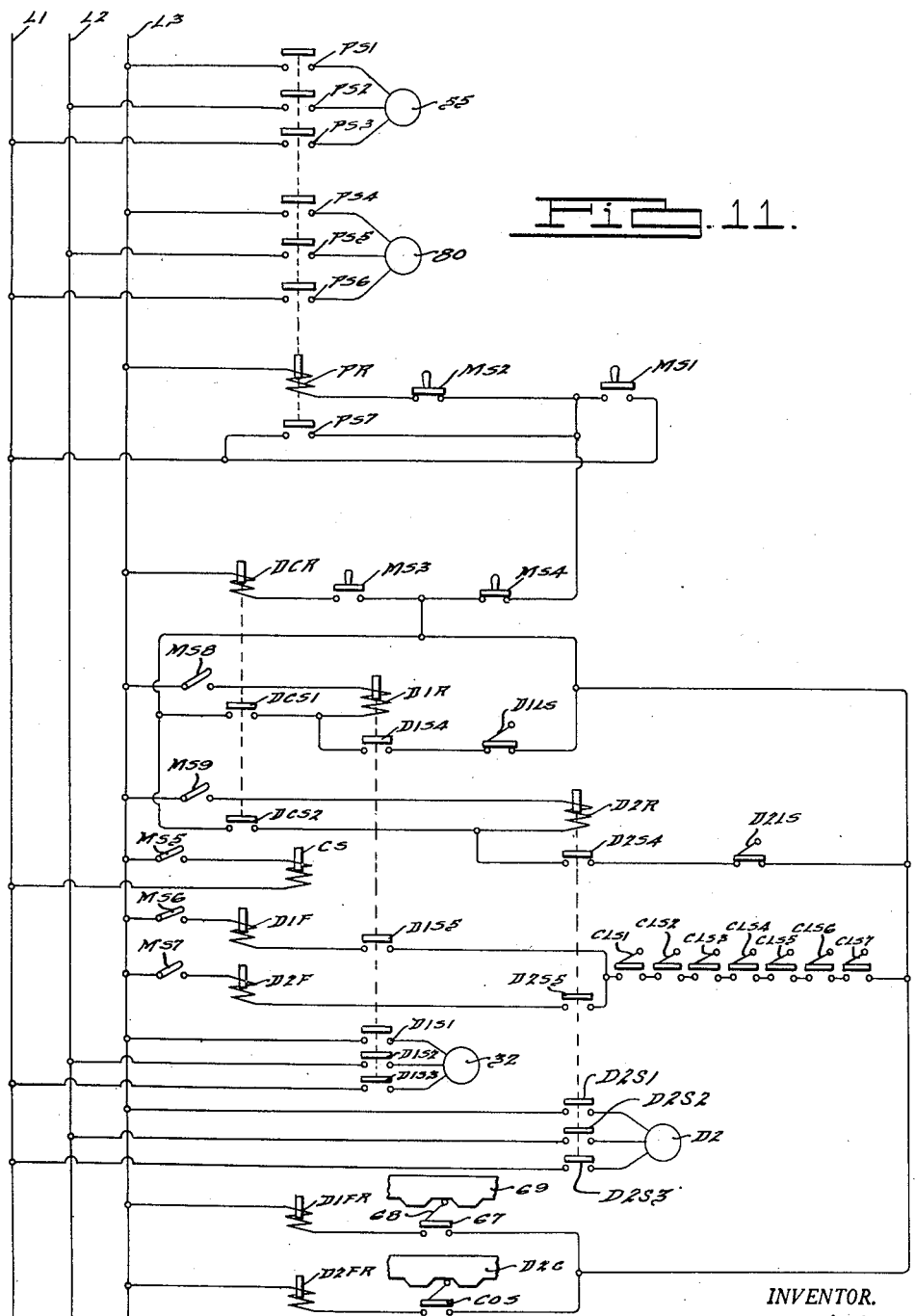
Fig. 11 is a line diagram showing schematically the electrical circuit for operating the machine of the present invention.

In general, the present invention is directed to a method of drilling holes through a workpiece of considerable length; and in the embodiment illustrated, a hinge or connector part having a length of from 36 to 60 inches has a pin or pintle hole drilled therethrough, throughout the length thereof. The drill is of considerable length, it being in excess of 200 times its diameter in length, and in the embodiment illustrated being about 350 times its diameter in length. The operation is a high speed, production operation; and, while not so specifically limited, has particular utility in the drililng of pintle holes in hinge or connector parts. The pintle holes are maintained concentric throughout the lengths of all of the mating hinge parts so that the hinge parts will properly mate. It will be appreciated that if the hole is eccentric there is a loss of strength in the hinge parts and either the hinge sections won't mate or too much clearance will have to be provided.

In the embodiment illustrated, the workpiece is shown in Fig. 10 and comprises an elongated hinge or connector part which is of considerable length. The hinge 1 has a bead 2 formed along one edge, the bead 2 being substantially circular in cross-section. Portions 3 of predetermined length are milled out of the bead 2 to provide alternate spaces and projections, there being a great multiplicity of such projections along the length of the workpiece, as shown in Figs. 1, 2 and 10. The bead 2 is solid and the pintle holes 4 are drilled through the projections by the machine of the present invention. It will be understood that the hinge 1 is to mate with a complementary hinge part and is connected thereto by a hinge pin which is passed through the aligned openings 4.

The drilling machine of the present invention comprises a base 5 with a workpiece support generally indicated at 6 mounted on the top thereof. The work-support 6 is located intermediate the ends of the base 5, and similar drilling mechanisms generally indicated at 7 are disposed on the top of the base at the opposite ends of the work-support 6. The work-support 6 is of such a length that it may support two workpieces at the same time so that the two drill assemblies 7 may simultaneously drill the holes through two of the workpieces, or, a single workpiece may be drilled from opposite ends at the same time. A description of one of the drilling assemblies will be sufficient for an understanding of both.

The work-support 6 includes a spacer block 8 which extends along the length thereof and which is suitably mounted on the top of the base 5. A coolant drain tray is mounted on the base 5 for the purpose of carrying away the liquid coolant which is directed onto the work during the drilling operation. A mounting block 9 is fixedly mounted on the top of the spacer block 8 and is so fixed thereon that it may be adjusted to properly position a longitudinally extending V-shaped groove 10 with respect to the axis of the drill. The rounded beads formed on the workpieces 1 are adapted to be received within the V-shaped groove 10 and be clamped therein during the drilling operation so that the projections are precisely aligned with each other. A rough locator in the form of plate 11 extending along the front face of the block 8 is fixed thereto. Such plate 11 is formed with an upwardly directed channel 12 within which the leaf of the hinge part is received to support the workpiece prior to clamping.

The workpiece 1 is clamped in the groove 10 by means of a plurality of longitudinally spaced clamping mechanisms generally indicated at 13. Each clamping mechanism comprises a work-engaging plate 14 which extends longitudinally of the work-piece 1 and which is pivotally connected by means of a pivot pin 15 to the inner end of a slide member 16. The member 16 is slidably mounted within an opening 17 in an upstanding bracket 18. The outer end of the member 16 is connected to the inwardly projecting end of rod 19 of a double-acting air cylinder and piston motor 20. The motor 20 is fixedly mounted to a plate 21 which in turn rests upon a horizontal table 22. The sides of the plate 21 extend under the flanges of guide plates 23 which is in turn are fixed to the table 22. The motor 20 may thus be adjusted along the table 22 within the guides 23 by means of a screw interconnection therebetween, which is shown at 24. Thus, the clamp 14 may be adjusted toward and from the workpiece. To permit adjustment vertically, the table 22 is fixed to the top of an upstanding bracket 25 which is mounted to the front face of the base 5 for vertical adjustment thereon.

To provide support for the drill in the milled out spaces 3 of the hinge bead 2, accurately formed cylindrical bushings 26 are securely clamped in the V-shaped groove 10 by suitable clamping plates 27 mounted on the block 9. The bushings 26 are disposed to be received in the spaces 3 formed in the hinge bead 2 and the axial end of each bushing 26 adjacent the bead portion 2 into which the drill passes from the bushing during a drilling operation is tapered as indicated at 28 to facilitate the removal of the chips. Because of the accurate formation of the V-shaped groove 10 in the block 9, the bushings 26 when accurately formed and clamped in place by the plates 27 will afford a plurality of accurately aligned passages for supporting the drill.

Referring to Figs. 1, 2, and 7, the drill assembly 7 includes a carriage 30 slidably mounted on a bed 31 formed on or suitably secured to the base 5. An electric motor 32 is mounted on the carriage 30 and is drivingly connected by pulley belts 33 through a gear box 34 to a suitable drill chuck 35. The carriage 30 is reciprocated longitudinally of the bed 31 by means of a hydraulic double-acting cylinder and piston motor 36 mounted on the base 5 and having an elongated piston rod 37 extending outwardly thereof and connected to the carriage 30 through a bracket 38.

A pair of parallel guide bars 40 extend longitudinally of the bed 31 and are supported at their opposite ends in brackets 41 and 42 secured to the bed 31. These guide bars 40 carry automatically adjustable means which at all times properly supports that portion of the drill 43 between the drill chuck 35 and the workpiece 1. As illustrated in Figs. 1 and 2, when the drill 43 is in its fully retracted position, this means supports the entire length of the drill projecting outwardly from the drill chuck 35. This drill-supporting means comprises a plurality of plates 44 which are generally rectangular in shape as best illustrated in Fig. 9 and which are slidably mounted adjacent their opposite ends on the guide bars 40. Each of the plates 44 is provided with a central aperture 45 adapted to freely receive the drill 43 but prevent any appreciable bending thereof. The corresponding ends of adjacent plates 44 are interconnected by pivotally connected links 46, best illustrated in Figs. 7 and 8. At one end of the series of interconnected plates a plate 44 is secured to the bracket 42 and the plate at the opposite end of the series is connected to a bracket 47 mounted on the carriage 30. It will be appreciated that this construction permits the plates 44 to progressively collapse from the completely extended position illustrated in Fig. 1 to the collapsed position illustrated in Fig. 8 as the drilling operation progresses. The bracket 42, which is at the end of the bed 31 adjacent the work support 6, carries a bushing 48 which holds the drill 43 in accurately aligned position preparatory to entering the first portion of the workpiece.

It should be noted that the drill 43 has a long smooth shank portion and the flutes extend only a sufficient distance from the cutting edge to carry the chips from the projecting portion of the bead through which the drill is cutting. This prevents the margin of the flutes from having any tendency to deform the openings in the bead projections or the bushings 26.

Figure 12:
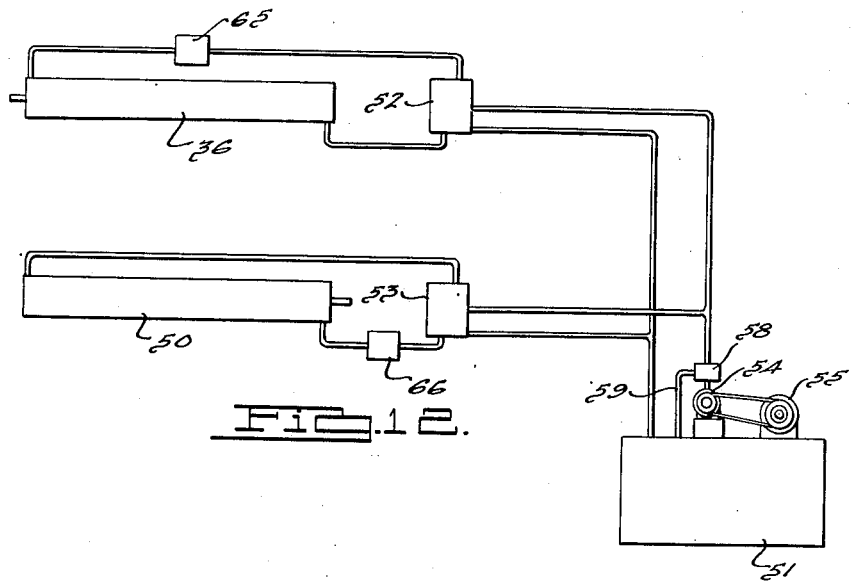
Fig. 12 is a diagrammatic view of the hydraulic feed means employed in the machine of the present invention; and, Fig. 13 is a diagrammatic view of the air-operated clamping means employed in the machine of the present invention.

It will be appreciated that in the complete machine a second hydraulic cylinder and piston motor 50 similar to the motor 36 is provided for reciprocating the drilling mechanism 7 at the opposite end of the machine from that illustrated in Figs. 1 and 2. These motors 36 and 50 are operated and controlled by means of a hydraulic circuit diagrammatically illustrated in Fig. 12. Fluid under pressure is supplied from the tank 51 to a pair of solenoid-operated valves 52 and 53 individual to the motors 36 and 50 by means of a pump driven by an electric motor 55. A suitable pressure relief valve 58 is provided at the discharge side of the pump, and is provided with the usual bypass 59 returning to the tank 51. The valves 52 and 53 are of conventional construction and movable between a first position, in which they supply fluid under pressure to their associated motor for moving the piston valve in one direction, and a second position, in which the application of fluid pressure is reversed and is effective for moving the piston in the opposite direction at an increased rate of speed.

Movement of the valve 52 between these positions is effected by means of a shifter rod 60 mounted on the base 5 adjacent the path of movement of the piston rod 37. A shifting dog 61 is mounted on the piston rod 37 adjacent its outer end and engages collars 62 and 62' on the rod 60 as the carriage 30 approaches the opposite limits of its movement to effect a shifting of the rod 60. Movement of the rod 60 energizes and de-energizes the solenoid of the valve 52 by shifting an arm 63 which operates a limit switch D1LS connected to the just-mentioned solenoid as hereinafter described. The limit switch D1LS also forms a part of the drill motor circuit as hereinafter described, and controls rotation of the drill. The switch arm 63 is disposed to be engaged and moved by collars 64 and 64' mounted on the shifter rod 60.

To minimize the overall time of the entire drilling operation, means are provided for feeding the drill at an increased rate during the periods in which the drill is passing through the spaces 3 between adjacent portions of the hinge bead. This just-mentioned means comprises solenoid-operated valves 65 and 66 in the lines through which fluid is supplied to the feed motors 36 and 56 during the infeeding of the drill. These valves are adapted to supply fluid to the motors at two different rates to afford a fast and a slow feed of the drill. The valve 65 is controlled by a switch 67 which is opened and closed in response to movement of a spring pressed finger 68 which is mounted on the carriage 30 and rides on a cam 69 adjustably mounted on the bed 31. The cam 69 is proportioned generally similar to the workpiece to be drilled and has alternating projecting and cutaway portions. When the finger 68 drops into the cutaway spaces the valve 65 is shifted to increase the feed. The valve 66 is similarly controlled by a cam operated switch COS.

Figure 13:
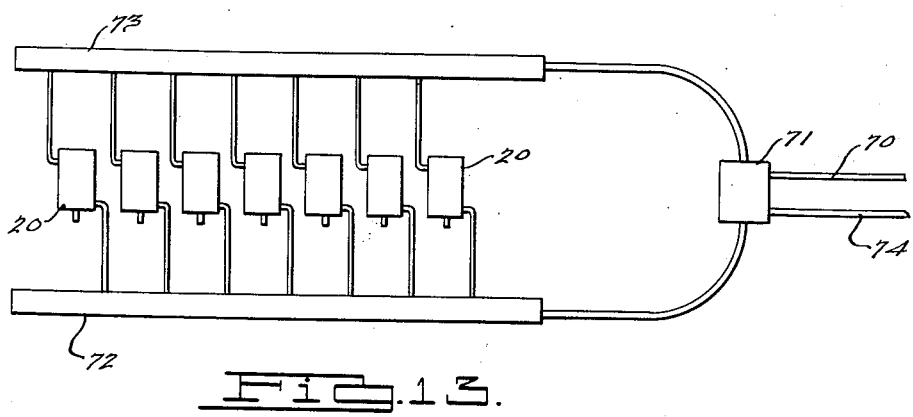

The double-acting air cylinder and piston motors 20 which control the operation of the clamping mechanisms 13 are preferably simultaneously operated. A pneumatic circuit providing this simultaneous operation is illustrated in Fig. 13 and comprises an air supply line 70 adapted to be connected to an air compressor or other suitable source of air under pressure, a solenoid-operated air valve 71, a pair of manifolds 72 and 73 connected to corresponding sides of each of the motors 20 and each connected to the valve 71, and an exhaust line 74. The valve 71 is of conventional construction, and is movable between a first position in which air is supplied to each of the motors 20 to move the pistons thereof in one direction, and a second position in which the air pressure is reversed and is effective to move the pistons in the opposite direction.

A suitable but illustrative wiring diagram for the machine is shown schematically in Figure 14 of the drawings. Electric energy from a suitable source of supply is furnished through lines L1, L2, and L3. A manual pump motor starting switch MS1 is provided having one terminal thereof connected through a manual pump motor stop switch MS2 and a pump motor relay coil PR to the line L3, and the other terminal connected to the line L1. Energization of the coil PR closes switches PS1, PS2, PS3, PS4, PS5, and PS6, thereby operating the hydraulic pump motor 55 and a coolant pump motor 80. Energization of the coil PR also closes the relay holding switch PS7 which is connected in parallel with the manual switch MS1.

A manual drill switch MS3 has one terminal connected through a manual drill stop switch MS4 and switch PS7 to the line L1, and its other terminal is connected through a drill circuit relay coil DCR to the line L3. Energization of the coil DCR closes the drill circuit switches DCS1 and DCS2 each of which has one terminal connected to the line L1 through the switches MS4 and PS7. The other terminals of these switches are connected respectively through first and second drill motor relay coils D1R and D2R and manual switches MS8 and MS9, respectively, to the line L3. Either of the drills may be operated separately by opening the manual switch MS8 or MS9 controlling the other drill. The circuits controlling the rotation and feeding of the two drills are similar and accordingly only the circuits for controlling the first drill are described in detail herein.

The coil D1R, when energized, closes the switches D1S1, D1S2, and D1S3 and thereby operates the motor 32 which rotates the first drill. To maintain the coil D1R energized, it also closes a relay holding switch D1S4 which is connected in series with a limit switch D1LS and both of which are connected in parallel with the drill circuit switch DCS1.

A manual clamp switch MS5 has one terminal connected to the line L3 and its other terminal connected through the solenoid CS of the clamp valve 71 to the line L1.

A manual drill feed switch MS6 has one terminal connected to the line L3 and the other terminal is connected to the line L1 through solenoid D1F of the valve 52, a switch D1S5, the limit switches CLS1, CLS2, CLS3, CLS4, CLS5, CLS6 and CLS7, the switch MS4 and the switch PS7. The switch D1S5 is closed by energization of the coil D1R and the switches CLS1 through CLS7 are closed when the clamps 13 are abutting the workpiece 1 in clamping position.

Similarly, the coil D2R closes switches D2S1, D2S2, and D2S3 to operate the second drill motor, D2, corresponding to the motor 32. Also it closes a switch D2S4 which is in series with a limit switch D2LS and both of which are in parallel with switch DCS2. Also a manual switch MS7, a solenoid D2F, and a switch D2S5 are connected in parallel with the corresponding just-mentioned solenoid D1F and switches MS6, and D1S5 and control the feed of the second drill at the other end of the machine.

The electrical circuit for effecting the above-described change in the rate of feed of the drill 43 extends from the line L3 through the solenoid D1FR which operates the valve 65 to vary the rate of feed, the cam operated switch 67, and switches MS4 and PS7 to line L1. Similarly for controlling the feed rate of the second drill, the solenoid D2FR of the valve 66 and a cam-operated switch COS are connected in parallel with the solenoid D1FR and the switch 67.

In operating the above described machine, a workpiece 1 is placed in the position illustrated in Figure 3 with the bead portion thereof supported in the channel 12 of the rough locating plate 11 with the bushings 26 received in the spaces 3 of the workpiece as best illustrated in Figure 6. The manual switch MS1 is then closed which starts the hydraulic pump and coolant motors 55 and 80 as above described, and the manual switch MS3 is then closed which starts the drill motors 32 and D2 as above described provided the manual switches MS8 and MS9 are closed. This closing of the switch MS3 also closes the switches D1S5 and D2S5 in the drill feed circuits, which switches serve to prevent feeding of the drills until the drill motors 32 and D2 have been started. It is also necessary to close the manual switch MS5 by which the clamping mechanisms are moved into clamping position before the drill feed circuits may be completed. When the clamps move to the clamping positions, the limit switches CLS1 through CLS7, which are common to the drill feed circuits are closed and these circuits may then be completed and the drills fed through the workpieces by closing the manual switches MS6 and MS7. During the drilling operation, the rate of feed of the drills is controlled by the cams 69 and D2C so that the drill carriages move at a slower speed suitable for drilling when the drills are cutting through a projecting bead portion, and move more rapidly when the drills are passing through the spaces 3 intermediate the projecting bead portions, as above described. In passing through the workpiece 1 as the drills enter each successive portion of the head 2, they are held in proper aligned position by the bushings 26. In one cycle the single drill is constantly rotated and is continuously approached and fed through the spaces and projections on the workpiece alternately and in sequence to drill the precisely aligned openings therethrough. Also, during this drilling operation, the portion of the drills between the drill chuck 35 and the workpiece 1 is supported by the plurality of plates 44 which progressively collapse to the position illustrated in Figure 8 as a drilling operation progresses. As the drills reach the limit of their movement, the shifter rod 60 is moved by the dog 61 as above described, and the limit switches D1LS and D2LS are opened. Opening of these switches deenergizes the coils D1R and D2R thereby stopping the drill motors 32 and D2 and opening the switches D1S5 and D2S5 in the drill feed circuits. This de-energizes the solenoids D1F and D2F of the valves 52 and 53 causing the latter to shift so as to apply hydraulic pressure to the motors 36 and 50 to return the drill carriages to their retracted positions. As the carriages approach the retracted position the shifter rods are shifted back to their initial position and the limit switches D1LS and D2LS are again closed. Also as the carriage 30 and drill 43 return to the retracted position illustrated in Figs. 1 and 2 it will be appreciated that the drill supporting plates will be again spread from the collapsed position of Fig. 8 to the expanded position illustrated in Figs. 1 and 2.

In the method above described, the projections on the workpiece are precisely aligned when they are clamped into the V groove 10 of the supporting block. The drill is constantly rotated and continuously fed through the work so that it drills through the projections, then passes through the next succeeding space, then through the projection, etc. While drilling does not take place in the spaces, the drill is engaged and guided and aligned as it passes through the spaces by the bushings which are precisely aligned in the V groove, in the embodiment illustrated. It will be appreciated that while only one embodiment of an apparatus has been disclosed for practicing the method here claimed, other distinctly different apparatuses may be employed. For example, the method of the present invention may be practiced with the machine disclosed in the copending application of Roger G. Cudini, Serial No. 29,690, filed May 28, 1948. It will be appreciated by those skilled in the art that numerous modifications and changes may be made without departing from the spirit of the invention the scope of which is commensurate with the appended claims.

What is claimed is:

1. The method of drilling a great multiplicity of precisely aligned openings through a great multiplicity of spaced projections along the length of an elongated workpiece which comprises precisely aligning said projections with each other, constantly rotating and continuously approaching and feeding a single drill through said spaces and projections alternately and in sequence and in one pass to drill precisely aligned openings therethrough, and engaging and guiding the leading end of said drill as it passes through the spaces between said projections.

2. The method of drilling a great multiplicity of precisely aligned openings through a great multiplicity of spaced projections along the length of an elongated workpiece having a length in excess of two hundred times the diameter of the hole to be drilled therethrough, which comprises precisely aligning said projections with each other, constantly rotating and continuously approaching and feeding a single drill having a length in excess of two hundred times its diameter through said spaces and projections in sequence and in one pass to drill precisely aligned openings therethrough, and engaging and guiding the leading end of said drill as it passes through the spaces between said projections.

ROGER G. CUDINI.

REFERENCES CITED

The following references are of record in the file of this patent:

UNITED STATES PATENTS

| Number | Name | Date |
|---|---|---|
| 2,487,823 | Mettrick et al. | Nov. 15, 1949 |